June 30, 1953  J. H. ANDRESEN, JR  2,643,870
INTEGRATING ACCELEROMETER
Filed Dec. 11, 1951  3 Sheets-Sheet 3
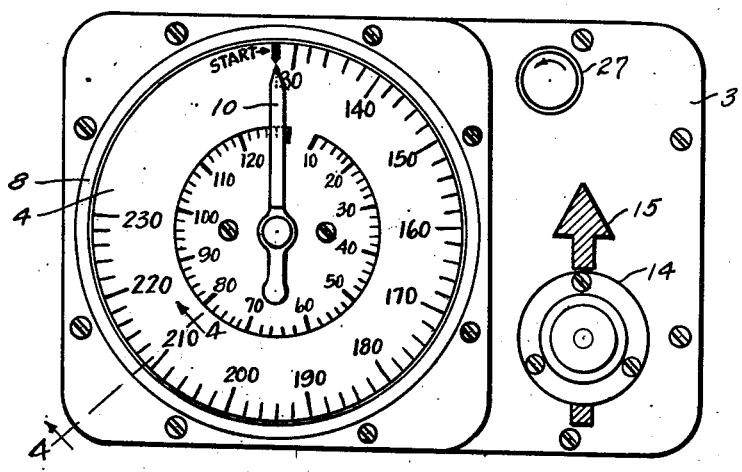
Fig. 3.
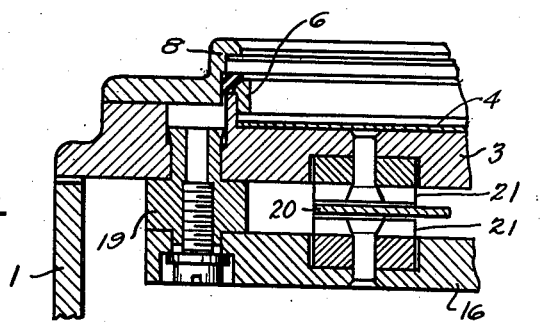
Fig. 4.
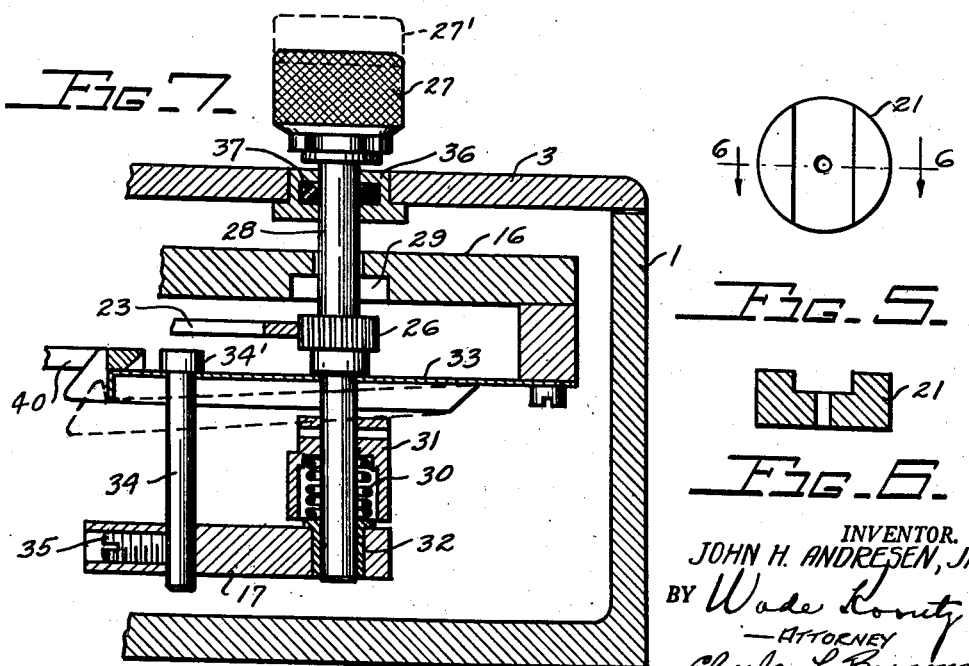
Fig. 7.
Fig. 5.
Fig. 6.
INVENTOR.
JOHN H. ANDRESEN, JR.
BY Wade Kovity
ATTORNEY
Charles L. Burgoyne
AGENT Patented June 30, 1953

2,643,870

UNITED STATES PATENT OFFICE 2,643,870

INTEGRATING ACCELEROMETER

John H. Andresen, Jr., Greenwood Lake, N. Y., assignor to the United States of America as represented by the Secretary of the Air Force Application December 11, 1951, Serial No. 261,093

2 Claims. (Cl. 264—1)

This invention relates to an integrating accelerometer adapted to indicate on a dial the maximum velocity attained by a moving body being accelerated from an initial position of rest.

The primary object of the invention is to provide an integrating accelerometer including a movably mounted weight, a dial and pointer indicating means, an actuating mechanism connecting the weight and indicating means, and a magnetically damped disk associated with the indicating means to integrate the displacement due to acceleration and thereby provide an indication of maximum velocity attained by the accelerometer.

A further object of the invention is to provide an integrating accelerometer including a pair of rotatably mounted gear sectors in meshing relation, a dial and pointer indicating means, gearing means to transmit motion of the gear sectors to the pointer movable over the dial, and a magnetically damped disk carried on the pointer mounting shaft to integrate the displacement due to acceleration of the gear sectors and thereby provide an indication of maximum velocity attained by the accelerometer.

The above and other objects of the invention will become apparent upon reading the following detailed description in conjunction with the drawings, in which:

Fig. 3 is a plan view to reduced scale of the visible face of the instrument.

Fig. 4 is a cross sectional view taken on line 4—4 of Fig. 3.

Fig. 5 is a plan view of one of the damping magnets seen in Fig. 4.

Fig. 6 is a transverse cross section taken on line 6—6 of Fig. 5.

Fig. 7 is a fragmentary cross section taken on line 7—7 of Fig. 2.

Figure 1:
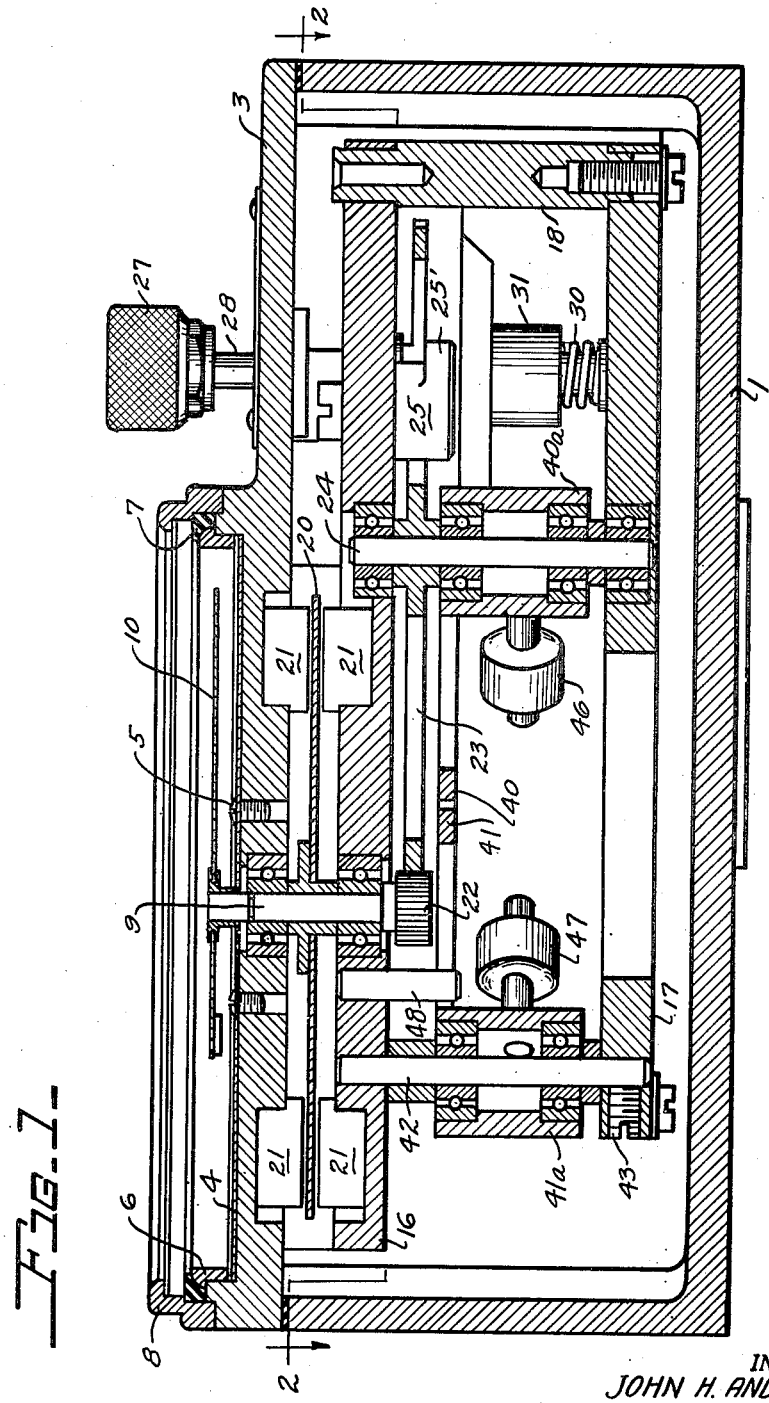
Fig. 1 is a longitudinal cross section taken through the integrating accelerometer at a plane passing through the axes of rotation of two pivoted weights.
Figure 2:
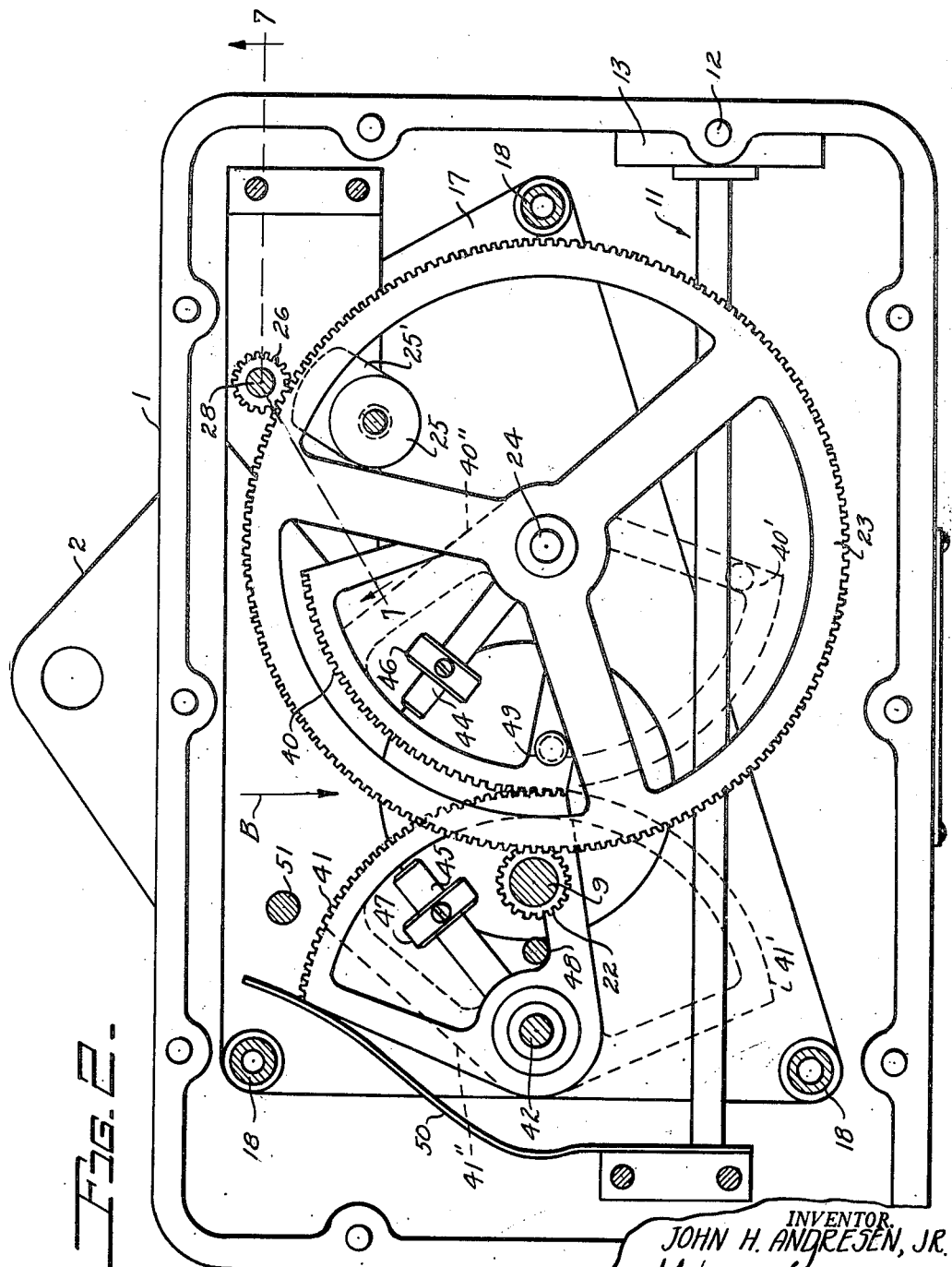
Fig. 2 is a transverse cross section taken through the integrating accelerometer on line 2—2 of Fig. 1.

Referring to the drawings and particularly to Figs. 1 and 2 the present integrating accelerometer will first be described in detail. The instrument is contained in a rectangular housing 1 having one or more integral lugs 2 used in fastening the device onto a movable body, vehicle, aircraft or carriage. A cover plate 3 is used to close the top of the housing. Superimposed on the cover plate 3 at one end thereof is a circular dial 4 held in place by screws 5. A marginal ring 6, gasket 7 and crystal retaining ring 8 completes the dial assembly. Projecting upwardly through the center of the dial 4 is a handstaff 9 which carries a hand or pointer 10 indicating the maximum velocity in conjunction with suitable indicia arranged around the periphery of the dial. Since the pointer is capable of making almost two complete revolutions, the indicia is arranged in two circular series. The inner indicia reads from 10 to 130 and the outer indicia reads from 130 to 230, the units in this case being knots at 59° Fahrenheit. An expansion rod type of thermometer 11 is secured in one end wall of the housing, as at 12, and includes a small dial portion 13 readable from the outside face of the end wall in determining the temperature correction to be applied in calculating the exact maximum velocity. Mounted on the cover plate 3 is a spirit level 14 to be used in leveling up the accelerometer. Since the present instrument is intended to measure the horizontal component of velocity change in a carriage or moving body, it is necessary to eleminate the effect of gravity acceleration. Thus the level 14 may be relied on to locate the device in a position where the moving weights in the instrument are movable only in horizontal planes. An arrow indicia 15 extending in a fixed direction with respect to the instrument shows the direction in which the instrument should be moved to produce the velocity reading on the dial 4. This direction of movement may be termed the sensitive direction of the instrument.

The mechanism of the instrument is contained principally between two spaced parallel bearing plates 16 and 17 connected by a plurality of posts 18. The bearing plate assembly is supported on the cover plate 3 by means of a plurality of posts 19 and it is therefore clear that the mechanism may be removed along with the cover plate 3. Mounted rigidly on the handstaff 9 and located midway between the cover plate 3 and bearing plate 16 is an eddy current drag rotor 20 which is preferably made of aluminum, although other metals having high conductivity may be used. The rotor is merely a thin metallic disk rotatably mounted between a circular array of permanent magnets 21 (see Figs. 1, 4, 5 and 6) in close proximity thereto. The magnetically damped disk provides a restraining force on the handstaff 9 which is directly proportional to the angular velocity. This is due to the fact that the magnitude of the eddy currents in the disk are directly proportional to the flux density and the speed of rotation. Also the greater the value of the eddy currents circulating in the disk, the more force will be required to rotate any selected portion of the disk past a selected magnet. The action is very similar to that of any electrical generator, which requires a power input at the shaft in direct proportion to the electrical power developed by the generator. As will be noted in Fig. 4 the permanent magnets 21 of shallow U-shaped cross section are so arranged that the pole pieces or legs extend generally in a radial direction with respect to the damping disk 20 and handstaff 9. The number of magnets 21 may vary considerably but in one example where the damping disk 20 was about two and one-half inches in diameter, there were provided fourteen magnets with very little spacing between adjacent magnets at one side of the rotor. Each magnet in this example was about three-eights of an inch in diameter and about three-sixteenths of an inch long at the pole pieces or legs.

The handstaff 9 has fixed thereon a pinion gear 22 meshing with a gear wheel 23, the latter being fixed on a freely rotatable shaft 24. The range of rotation of the gear wheel 23 is limited by the abutment member 25 fixed on the bearing plate 16. As may be seen in Fig. 2 the wheel 23 has less than a 60° range of rotation. The abutment member 25 includes a flange 25' located under but spaced slightly from the rim of the wheel 23. This prevents possible bending of the wheel when a manually operated drive pinion 26 is brought into mesh with the gear wheel by an inward push on knob 27. A shaft 28 slidably and rotatably mounted through the cover plate 3, bearing plate 16 and bearing plate 17 serves to rigidly connect the pinion 26 and knob 27 (see Fig. 7). A recess 29 in the bearing plate 16 serves to permit retraction of the knob 27 and unmeshing of the gear wheel 23 and pinion 26. Such retraction is assisted by a compression spring 30 inside a thimble 31 fixed on shaft 28. The spring also bears on a bushing 32 fixed in the bearing plate 17. The pinion 26 also bears on a spring arm latch 33 in the positon shown (Fig. 7), so that further inward movement of the knob 27 will move the latch to the unlatched or dotted line position. The offset or hook-like end of the latch normally engages a spoke of a weight actuated gear sector to be described below. A smooth post 34 fixed in the bearing plate 17 by means of a set-screw 35 passes through the latch 33 and includes a head 34' to limit the movement of the latch as shown. When the pinion 26 is to be unmeshed with respect to the gear wheel 23, the operator merely releases the knob 27 which moves outwardly to the dotted line position 27', whereupon the pinion 26 takes a position in the recess 29. A hollow bushing 36 contains a rubber ring 37 through which the shaft 28 extends, thus excluding dirt and dust from the instrument case. The fully retracted position of the knob 27 and shaft 28 will be seen in Fig. 1.

A pair of gear sectors 40 and 41 which are constantly in mesh are mounted to turn freely on shafts 24 and 42. The two gear sectors include hub portions 40a and 41a carried on antifriction bearings positioned on the respective shafts 24 and 42. The shaft 42 is secured fast in the bearing plate 17 by means of a set screw 43. The hub portions 40a and 41a have short rods 44 and 45 extending radially therefrom in positions intermediate of the side edges of the gear sectors (see Fig. 2). Small weights 46 and 47 are adjustably mounted on the rods 44 and 45 so that the instrument may be adjusted and calibrated. A stop pin 48 acts to determine the extreme limits of movement of the gear sector 41 directly and of the gear sector 40 indirectly. The inactive positions of the gear sectors are shown by the full lines in Fig. 2 and when released for movement the gear sectors are free to move in the general direction of arrow B but only through an angle as determined by the stop pin 48. The other extreme positions of the sectors 40 and 41 are shown by the dotted outlines 40' and 41' in Fig. 2. Movement of the gear sectors 40 and 41 in the general direction of arrow B causes counterclockwise rotation of sector 40 and through a laterally projecting pin 49 on the sector 40 also causes counterclockwise rotation of the gear wheel 23. The pinion 22, handstaff 9 and pointer 10 are thereby caused to rotate in a clockwise direction. The full range of movement of the gear sectors 40 and 41 as determined by the stop pin 48 is less than a right angle but because of the difference in size of the gear wheel 23 and pinion 22 the full range of pointer movement is about one and three-fourths revolution, so that the indication on dial 4 of maximum velocity extends from 10 knots up to 230 knots.

Since the gear sector 40 is normally latched in the full line position of Fig. 2 by means of the spring arm latch member 33, there is provided a spring arm starter 50 bearing on one corner of the sector 41 to move both gear sectors slightly when latch 33 is released from the sector 40. This prevents re-engagement of the latch and sector upon release of the manual control knob 27. The spring 50 bears only lightly on the sector 41 and furthermore a stop pin 51 close to the spring arm starter prevents any excessive movement thereof. The initial movement of the gear sectors under the action of the spring starter 50 will bring the sectors to a position corresponding to the dotted line positions 40" and 41". However this initial movement of the sectors will not affect the gear wheel 23 and pointer 10 for reasons to be explained below.

Considering again the spring arm latch 33 of Fig. 7 it will be noted that there are three positions of the knob 27, of which the solid line showing is the intermediate position. An additional innermost position is that which causes the release of spring arm latch 33. The intermediate position is that which effects meshing of pinion 26 and gear wheel 23, whereby the pointer 10 may be adjusted to the zero position. The outermost position of the knob, as at 27', is that which the knob assumes when released and wherein the pinion 26 is out of mesh with the gear wheel 23.

The mode of operation will now be outlined in full. The instrument is intended for mounting on a substantially horizontal surface forming part of a movable carriage or aircraft launching device. Shims may be placed under the instrument until the spirit level 14 indicates that the instrument is level. The arrow 15 should point in the direction of forward movement of the carriage or other vehicle. Now before the carriage starts to move, the instrument is put in starting condition by pushing the knob 27 inward and turning it in a counterclockwise direction. This causes the gear wheel 23 and the sector 40 to turn clockwise to the full line positions as in Fig. 2. Now the knob 27 is allowed to move outwardly under the action of spring 30 and before the pinion 26 is disengaged from the gear wheel 23 the spring latch 33 engages the adjacent spoke of sector 40 to retain the sectors 40 and 41 in the full line positions of Fig. 2 with the starter spring 50 bearing on sector 41. Now the pointer 10 will be located about a quarter turn to the left of the zero or Start position. However by carefully rotating the knob 27 clockwise with the pinion 26 still in mesh with the gear wheel 23, the pointer 10 is brought to the Start position before releasing the knob and completely disengaging pinion 26 from gear wheel 23. This quarter turn of the knob and pointer in a clockwise direction is accompanied by a smaller angular displacement of gear wheel 23 in a counterclockwise direction. This latter displacement of the gear wheel results in an initial spacing between the pin 49 on sector 40 and the adjacent spoke of gear wheel 23. Now before launching of the carriage or vehicle the knob 27 is pushed in without any attempt to rotate the same. This causes release of the latch 33 from the sector 40 and the starter spring 50 now moves the gear sectors to positions 40″ and 41″ and will bring the pin 49 into close proximity to the adjacent spoke of gear wheel 23. Now the forward acceleration of the carriage during its run causes the sectors and weighted arms to move in the general direction of arrow B, the sensitive direction of the instrument. This results in clockwise rotation of pointer 10 around the dial 4. The use of the magnetically damped disk 20 results in an integrating action with respect to the acceleration, which would be indicated if the disk 20 were not present. Thus the dial and pointer actually indicate the maximum velocity of the carriage during its run. Since the eddy current damping force on the disk 20 is affected by changes in conductivity of the disk with changes in temperature, temperature correction of the indicated velocity will be necessary if the instrument is at a temperature which differs appreciably from 59° F. The latter is preferred as a calibration base but other calibration temperatures may be selected in constructing and adjusting the instrument.

The theory of operation is fairly simple. It is based on the fact that the restraining torque on the handstaff 9 due to the disk 20 and magnets 21 is proportional to the speed of rotation of the disk. This may be stated by the equation:

$$T = K \times \omega \quad (1)$$

Also the sectors 40 and 41 which are geared to the handstaff 9 through gear wheel 23 provide an unbalanced moment whereby a torque is applied to the handstaff when there is an acceleration along the sensitive direction of the instrument. This actuating torque may be expressed by the following equation:

$$T = m \times a \times r \quad (2)$$

where $m$ is the unbalanced mass.
$r$ is the effective radius of the mass.
$a$ is the linear acceleration.

For any indication of maximum velocity on the dial 4 the restraining torque is equal to the actuating torque.
Therefore:

$$m \times a \times r = K \times \omega \quad (3)$$

The velocity of the instrument along the sensitive direction is equal to the acceleration multiplied by a time interval. Thus both sides of Equation 3 may be multiplied by a time interval $t$, as follows:

$$m \times a \times t \times r = K \times \omega \times t \quad (4)$$

or $$m \times V \times r = K \times \omega \times t \quad (5)$$

Combining all the constants in one the result may be expressed as follows:

$$V = K_2 \times \omega \times t \quad (6)$$

Since the angular velocity $\omega$ multiplied by a time interval equals the angular displacement then:

$$V = K_2 \times I \quad (7)$$

where $I$ is the instrument indication. This relation shows that the indication of the instrument is a measure of or proportional to the linear velocity of the complete instrument. While the effective radius $r$ will vary slightly as the sectors 40 and 41 move from positions 40″, 41″ to positions 40′, 41′ this slight variation merely causes the dial indicia to assume a non-linear characteristic in calibration thereof. The non-linearity is slight but can be detected by comparing two remote points on the inner and outer series of numerals.

The embodiments of the invention herein shown and described are to be regarded as illustrative only and it is to be understood that the invention is susceptible of variations, modifications and changes within the scope of the appended claims.

I claim:

1. An integrating accelerometer comprising, a pair of similarly shaped rotatably mounted gear sectors in meshing relation and having a sensitive direction of movement under the force of acceleration extending along the common tangent at the point of meshing engagement, a rotatably mounted indicating means, a gear wheel concentrically mounted for rotation with respect to one of said gear sectors and having a portion engageable by a projection on said one gear sector for rotating said gear wheel in one direction of rotation on rotation of said one gear sector in said one direction, a spring latch adjacent to said one gear sector and adjacent to said gear wheel to engage one side edge of said one gear sector and retain said gear sectors in an inactive position, a shaft slidably and rotatably mounted adjacent to said gear wheel, a first pinion on said shaft adapted to engage said gear wheel in meshing relation and also adapted to engage said latch for releasing the latch from said one gear sector, a second pinion in meshing relation with said gear wheel and connected to said indicating means, and a magnetically damped metallic member connected to said indicating means, and rotatable simultaneously therewith to integrate the displacement of said indicating means due to acceleration of said gear sectors in said sensitive direction, whereby said indicating means will indicate the velocity attained by the accelerometer during a particular limited course of travel extending in said sensitive direction.

2. An integrating accelerometer comprising, a pair of similarly shaped rotatably mounted gear sectors in meshing relation and having a sensitive direction of movement under the force of acceleration extending along the common tangent at the point of meshing engagement, a rotatably mounted indicating means, a gear wheel concentrically mounted for rotation with respect to one of said gear sectors and having a portion engageable by a projection on said one gear sector for rotating said gear wheel in one direction of rotation on rotation of said one gear section in said one direction, a shaft slidably and rotatably mounted adjacent to said gear wheel, said shaft provided with means for releasably locking said one gear section and for driving said gear wheel, said gear wheel being drivingly connected to said indicator means, and a magnetically damped metallic member connected to said indicating means, and being rotatable simultaneously therewith to integrate the displacement of said indicating means due to acceleration of said gear sectors in said sensitive direction.

JOHN H. ANDRESEN, Jr.

References Cited in the file of this patent

UNITED STATES PATENTS

| Number | Name | Date |
| --- | --- | --- |
| 982,336 | Wimperis | Jan. 24, 1911 |
| 1,280,508 | McHenry | Oct. 1, 1918 |
| 1,298,494 | Gwinn | Mar. 25, 1919 |
| 2,262,007 | Kollsman | Nov. 11, 1941 |
| 2,303,799 | Summers | Dec. 1, 1942 |
| 2,522,536 | Rabinow | Sept. 19, 1950 |